United States Patent
Maheswaran et al.

(10) Patent No.: US 11,727,923 B2
(45) Date of Patent: Aug. 15, 2023

(54) SYSTEM AND METHOD FOR VIRTUAL CONVERSATIONS

(71) Applicant: Coinbase, Inc., Oakland, CA (US)

(72) Inventors: Arjun Kumeresh Maheswaran, Bangalore (IN); Akhilesh Sudhakar, Chennai (IN); Bhargav Upadhyay, Mangrol (IN)

(73) Assignee: Coinbase, Inc., Oakland, CA (US)

(*) Notice: Subject to any disclaimer, the term of this patent is extended or adjusted under 35 U.S.C. 154(b) by 274 days.

(21) Appl. No.: 17/102,570

(22) Filed: Nov. 24, 2020

(65) Prior Publication Data

US 2022/0165256 A1    May 26, 2022

(51) Int. Cl.
*G10L 15/18* (2013.01)
*G06N 20/00* (2019.01)
(Continued)

(52) U.S. Cl.
CPC .......... *G10L 15/1822* (2013.01); *G06N 20/00* (2019.01); *G10L 13/08* (2013.01); *G10L 15/1815* (2013.01); *G10L 2015/228* (2013.01)

(58) Field of Classification Search
CPC . G10L 15/1822; G10L 15/1815; G10L 13/08; G10L 2015/228
See application file for complete search history.

(56) References Cited

U.S. PATENT DOCUMENTS 11,086,858 B1 *   8/2021  Koukoumidis .......... G06N 3/08
2014/0278413 A1 * 9/2014  Pitschel ................... G10L 15/22
                                                          704/243

(Continued)

FOREIGN PATENT DOCUMENTS

KR    101987114 B1    9/2019
WO    2019113122 A1   6/2019

OTHER PUBLICATIONS

Damien K. Ming, Sorawat Sangkaew, Ho Q. Chanh, Phung T.H. Nhat, Sophie Yacoub, Pantelis Georgiou, and Alison H. Holmesa; Continuous physiological monitoring using wearable technology to inform individual management of infectious diseases, public health and outbreak responses; International Journal of Infectious Diseases; Jul. 2020; 96:648-654.

(Continued)

*Primary Examiner* — Anne L Thomas-Homescu
(74) *Attorney, Agent, or Firm* — Perkins Coie LLP

(57) ABSTRACT

A method for conducting a conversation between a user and a virtual agent is disclosed. The method includes receiving, by an ASR sub-system, a plurality of utterances from the user, and converting, by the ASR sub-system, each utterance of the plurality of utterances into a text message. The method further includes determining, by a NLU sub-system, an intent, at least one entity associated to the intent, or a combination thereof from the text message. The method further includes generating, by a conversation management sub-system, a predefined conversation map for a determination of at least one text based agent response for the text message based on: selecting at least one conversation block sub-system from a plurality of conversation block sub-systems; sending a request along with the intent and the at least one entity to each selected at least one conversation block for execution of a specific function associated with the selected at least one conversation block; receiving an agent intent from the selected at least one conversation block sub-system and generating the at least one a text based agent response for the user based on the at least one agent intent.

19 Claims, 7 Drawing Sheets

(51) Int. Cl.
*G10L 13/08* (2013.01)
*G10L 15/22* (2006.01)

(56) References Cited

U.S. PATENT DOCUMENTS

| | | | | |
|---|---|---|---|---|
| 2016/0098988 | A1* | 4/2016 | Goussard | G10L 15/1822 704/257 |
| 2017/0048170 | A1* | 2/2017 | Smullen | H04L 67/02 |
| 2017/0185375 | A1* | 6/2017 | Martel | G06F 40/30 |
| 2017/0358305 | A1* | 12/2017 | Kudurshian | G10L 15/1815 |
| 2018/0232376 | A1* | 8/2018 | Zhu | G06F 40/35 |
| 2018/0261223 | A1* | 9/2018 | Jain | G06Q 30/0601 |
| 2018/0329998 | A1* | 11/2018 | Thomson | H04N 21/2393 |
| 2018/0330723 | A1* | 11/2018 | Acero | G10L 13/04 |
| 2018/0336904 | A1* | 11/2018 | Piercy | G10L 17/22 |
| 2019/0042988 | A1* | 2/2019 | Brown | G06N 5/022 |
| 2019/0057143 | A1* | 2/2019 | Porter | G06F 16/285 |
| 2020/0007380 | A1* | 1/2020 | Chen | H04L 51/02 |
| 2020/0020331 | A1* | 1/2020 | Kim | G10L 15/30 |
| 2020/0090651 | A1* | 3/2020 | Tran | G10L 15/22 |
| 2020/0117709 | A1* | 4/2020 | Galitsky | G06F 16/953 |
| 2020/0125919 | A1* | 4/2020 | Liu | G06Q 30/0617 |
| 2020/0184992 | A1* | 6/2020 | Newell | G06N 5/046 |
| 2020/0193094 | A1* | 6/2020 | Topol | G06F 40/30 |
| 2021/0249009 | A1* | 8/2021 | Manju | H04M 1/72469 |
| 2021/0390268 | A1* | 12/2021 | Pandey | H04L 51/02 |
| 2021/0406046 | A1* | 12/2021 | Akrabi | G06F 9/542 |
| 2022/0014571 | A1* | 1/2022 | Polish | G06N 20/00 |
| 2022/0253611 | A1* | 8/2022 | Galitsky | G06K 9/6201 |

OTHER PUBLICATIONS

Damien K. Ming, Sorawat Sangkaew, Ho Q. Chanh; Intelligent Chatbots: A Guide to Building and Using Intelligent Agents; https://www.twilio.com/bots; Jun. 1, 2020.

* cited by examiner

SYSTEM AND METHOD FOR VIRTUAL CONVERSATIONS

FIELD OF INVENTION

Embodiments of a present disclosure relate to virtual conversations system and more particularly to, a system and a method for intelligently handling unstructured conversations and resolve complex user requests related to different task categories in a single conversation.

BACKGROUND

In today's fast faces and technology driven life artificial intelligence (AI) and automation with least human intervention have led us to an era of robots like internet bots, social bots, chat bots, video game bots, etc. Most of the businesses considering chatbots as their first layer of communication with the users which includes, lodging a complaint, request for a service, request for enquiry, registration, booking a hotel etc. Chatbots are software programs designed to interact with the users in a human-like behaviour either in form of texts or voice. Currently, Chatbots are capable of handling only a single defined task at a time and provide a solution for the single defined task. However, if the user conversation is unstructured and relates to multiple unlinked tasks the chatbots may not be able to correctly rectify the intents and provide a solution. In order to handle unstructured conversations, some chatbots are designed with consideration of multiple different tasks, however these chatbots are specifically designed to certain applications only and can not be re-used for other applications.

Hence, there is a need for a virtual conversation agent system which can resolve the aforementioned issues.

BRIEF DESCRIPTION

In accordance with one embodiment of the disclosure a virtual agent system for conducting a conversation with a user. The virtual agent system includes an automatic speech recognition (ASR) sub-system operable by one or more processors, wherein the ASR sub-system is configured to receive a plurality of utterances from the user and convert each utterance of the plurality of utterances into a text message. The virtual agent system includes a natural language understanding (NLU) sub-system operable by one or more processors and communicatively coupled with the ASR sub-system, wherein the NLU sub-system is configured to determine an intent, an entity associated to the intent, or a combination thereof from the text message. The virtual agent system further includes a conversation management sub-system operable by one or more processors and communicatively coupled with the NLU sub-system, wherein the conversation management sub-system is configured to generate a predefined conversation map based on predefined intents, predefined entities, or a combination thereof stored in the virtual agent system and the intent, entities, or a combination thereof determined from the text message, for determination of at least one agent intent for the text message, based on: selection of at least one conversation block sub-system from a plurality of conversation block sub-systems based on the determined intent, the at least one entity and a history map of a list of conversation block sub-systems of the plurality of conversation block sub-systems selected in previous conversations with the user, send a request along with the intent and the at least one entity to each selected at least one conversation block for execution of a specific function associated with the selected at least one conversation block, receive an agent intent from each selected at least one conversation block, and generate the at least one agent intent based on the agent intents received from each selected at least one conversation block. The virtual agent system further includes the plurality of conversation block sub-systems operable by one or more processors and communicatively coupled with the conversation management sub-system. The selected at least one conversation block sub-system is configured to: at least one of accept or deny the request received from the conversation management sub-system based on a capability of the selected at least one conversation block sub-system to execute the specific function, initiate execution of the specific function related to the predefined conversation map upon acceptance of the request, give a control of the request with other conversation block sub-system of the plurality of conversation block sub-systems for executing a sub-function of the specific function independent of an instruction from the conversation management sub-system, regain the control from the other conversation block sub-system upon completion of the sub-function, generate the agent intent upon completion of the specific function, and send the agent intent to the conversation management sub-system. The virtual agent system further includes a response generation sub-system configured to convert the at least one agent intent into a text response for the user.

In accordance with another embodiment of the disclosure, a method for conducting conversation between a user and a virtual agent is disclosed. The method includes receiving, by a ASR sub-system, a plurality of utterances from the user. The method includes converting, by the ASR sub-system, each utterance of the plurality of utterances into a text message. The method further includes determining, by an NLU sub-system, an intent, at least one entity associated to the intent, or a combination thereof from the text message. The method further includes generating, by a conversation management sub-system, a predefined conversation map based on predefined intents, predefined entities, or a combination thereof stored in the virtual agent system and the intent, entities, or a combination thereof determined from the text message for determination of at least one agent intent for the text message based on: selecting, by the conversation management sub-system, of at least one conversation block sub-system from a plurality of conversation block sub-systems; the plurality of conversation block sub-systems, sending, by the conversation management sub-system, a request along with the intent and the at least one entity to each selected at least one conversation block for execution of a specific function associated with the selected at least one conversation block, at least one of accepting or denying, by the selected at least one conversation block sub-system, the request received from the conversation management sub-system based on a capability of the selected at least one conversation block sub-system to execute the specific function, initiating, by the selected at least one conversation block sub-system, execution of the specific function related to the predefined conversation map upon acceptance of the request, and giving, by the selected at least one conversation block sub-system, a control of the request with other conversation block sub-system of the plurality of conversation block sub-systems for executing a sub-function of the specific function independent of an instruction from the conversation management sub-system, regaining, by the selected at least one conversation block sub-system, the control from the other conversation block sub-system upon completion of the sub-function, generating, by the selected at least one conversation block sub-system, the agent intent upon completion of the specific function, sending, by the selected at least one conversation block sub-system, the agent intent to the conversation management sub-system, receiving, by the conversation management sub-system, the agent intent, and generating the at least one agent intent based on the output received from the selected at least one conversation block sub-system. The method further includes generating, by a response generation sub-system, a text response for the user based on conversion of the at least one agent intent into text.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
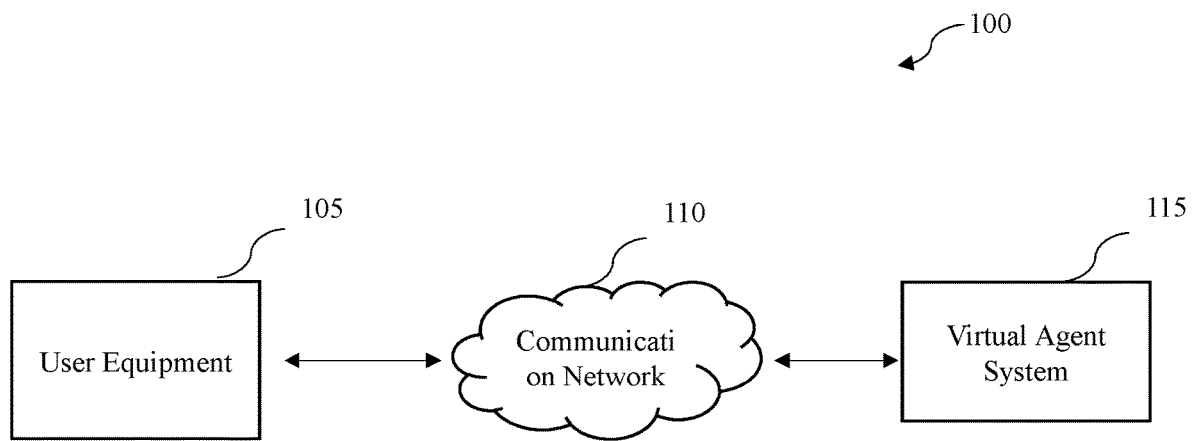
FIG. 1 is an illustration of an environment in which a virtual agent system, for conducting a virtual conversation with a user, is deployed, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a virtual agent system and a method for conducting a conversation with a user. The virtual agent system includes an automatic speech recognition (ASR) sub-system operable by one or more processors, wherein the ASR sub-system is configured to receive a plurality of utterances from the user and convert each utterance of the plurality of utterances into a text message. The virtual agent system includes a natural language understanding (NLU) sub-system operable by one or more processors and communicatively coupled with the ASR sub-system, wherein the NLU sub-system is configured to determine an intent, at least one entity associated to the intent, or a combination thereof from the text message. The virtual agent system further includes a conversation management sub-system operable by one or more processors and communicatively coupled with the NLU sub-system, wherein the conversation management sub-system is configured to generate a predefined conversation map based on predefined intents, predefined entities, or a combination thereof stored in the virtual agent system and the intent, entities, or a combination thereof determined from the text message, for determination of at least one agent intent for the text message, based on: selection of at least one conversation block sub-system from a plurality of conversation block sub-systems based on the determined intent, the at least one entity and a history map of a list of conversation block sub-systems of the plurality of conversation block sub-systems selected in previous conversations with the user, send a request along with the intent and the at least one entity to each selected at least one conversation block for execution of a specific function associated with the selected at least one conversation block, receive an agent intent from each selected at least one conversation block, and generate the at least one agent intent based on each selected at least one conversation block. The virtual agent system further includes the plurality of conversation block sub-systems operable by one or more processors and communicatively coupled with the conversation management sub-system. The selected at least one conversation block sub-system is configured to: at least one of accept or deny the request received from the conversation management sub-system based on a capability of the selected at least one conversation block sub-system to execute the specific function, initiate execution of the specific function related to the predefined conversation map upon acceptance of the request, give a control of the request with other conversation block sub-system of the plurality of conversation block sub-systems for executing a sub-function of the specific function independent of an instruction from the conversation management sub-system, regain the control from the other conversation block sub-system upon completion of the sub-function, generate the output upon completion of the specific function, and send the output to the conversation management sub-system. The virtual agent system further includes a response generation sub-system configured to convert the at least one agent intent into a text response for the user.

FIG. 1 illustrates an exemplary representation of an environment 100, for conducting a virtual conversation a user, in accordance with an embodiment of the present disclosure.

The environment 100 depicts a virtual agent system 115 in communication with a user equipment 105 via a communication network 110. The user equipment (UE) 105 is associated with a user. In a non-limiting example, the virtual agent system 115 may be accessed via digital platforms such as webpage of a merchant, an android application hosted by the merchant, an iOS application etc.

In an example embodiment the UE 105 may be a portable device. Examples of the portal device include, but not limited to, a smart phone, a personal digital assistant, and a laptop, among others. In some embodiments, the UE 105 may be a non-portable device. Examples of the non-portable device include, but not limited to, a personal computer or a kiosk, among others. The UE 105 may be any device that the user operates to establish a communication with the virtual agent system 115. The user may be a customer visiting a website over internet and commences a chat session with the virtual agent system 115.

In an example embodiment, the communication network 110 represents any distributed communication network (wired, wireless or otherwise) for data transmission and receipt between/among two or more points. The communication network 110 may as an example include cellular data networks (such as 2G, 3G, 4G or 5G), LAN, WAN, broadband connections, fibre net or any other form of internet or wired/wireless links.

The communication between the user and the virtual agent system 115 starts when the user access, via the UE 105, either a website or an application and initiates a conversation session with a virtual agent of the virtual agent system 115, or replies to an initial message of the virtual agent.

The virtual agent system 115 smartly handles the conversation with the user in a human-like manner and resolves queries and requests received in unstructured manner from the user during the conversation session with the user.

The system and method for intelligently conducting the conversation session with the user by the virtual agent are further described in FIGS. 2-5.

Figure 2:
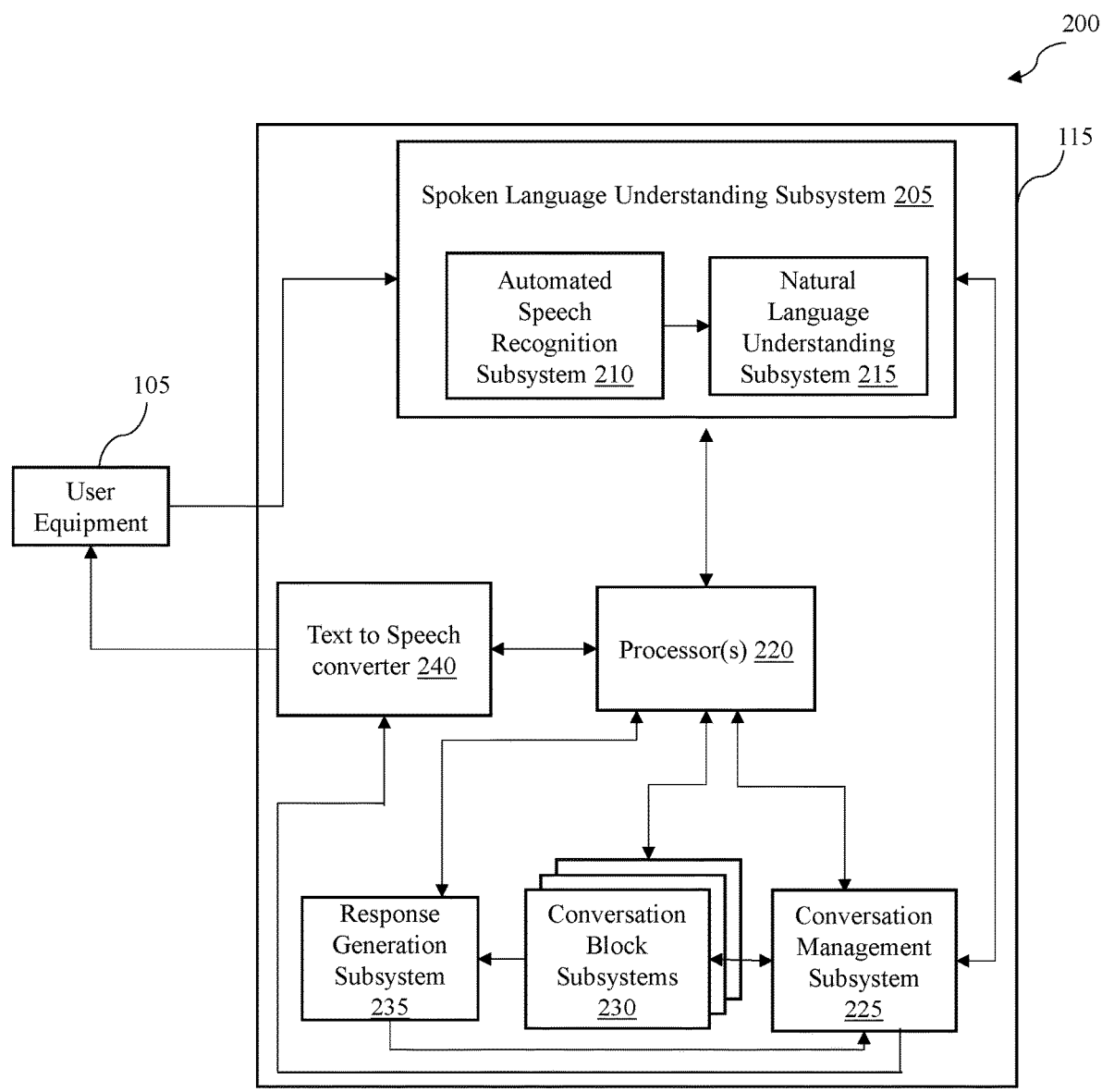
FIG. 2 is a block diagram representation of an embodiment of the virtual agent system for conducting the virtual conversation with the user, in accordance with an embodiment of the present disclosure.

FIG. 2 is block diagram representation of an embodiment of the virtual agent system 115 for conducting the virtual conversation with the user, in accordance with an embodiment of the present disclosure.

The virtual agent system 115 includes a spoken language understanding (SLU) sub-system 205 operable by the one or more processors 220. The SLU sub-system 205 includes an automated speech recognition (ASR) sub-system 210 and a natural language understanding (NLU) sub-system 215 operable by the one or more processors 220. The SLU sub-system 205 is configured to receive utterances from the user during the conversation session and extract intents and entities from the utterances. Specifically, the ASR sub-system 210 of the SLU sub-system 205 converts the utterances into texts and sends the converted texts to the NLU sub-system 215. The NLU sub-system 215 is configured to extract intents and entities from the converted text received from the ASR sub-system 210. In one embodiment, the intent is a context data identifier and the entity is the information The intent is a broad classification of a context of the utterance received from the user and entity is detailed information related to the intent. In other words, the intent represents a meaning, and the entity represents the information. For example, but not limited to, the utterance received from the user via the UE 105 is "I want to book flight to Hong Kong on October $5^{th}$", the intent for this utterance is "Book Flight" and the entities are "Destination: Hong Long", and "Journey date: October $5^{th}$". The NLU sub-system 215 is also configured to convert the extracted intents and entities into a standard format according to the virtual agent system 115. For example, but not limited to, the standard format of date may be "Month name, date and year".

In an embodiment, the NLU sub-system 215 is configured to be a state-less sub-system which generates the intents and entities based on only present input texts received from the ASR sub-system 210 and the NLU sub-system does not include past conversation history. Therefore, NLU sub-system 215 can be re-used with different systems for different applications without need of re-building or reconfiguration.

Further, the virtual agent system 115 includes a conversation management sub-system 225 operable by the one or more processors 220, and a plurality of conversation block sub-systems 230 operable by the one or more processors 220. The conversation management sub-system 225 is configured to receive the intents and entities from the SLU 205, and generate a predefined conversation map based on predefined intents, predefined entities, or a combination thereof stored in the virtual agent system and the intent, entities, or a combination thereof determined from the text message for determination of an appropriate text based agent response for the received intents and entities. The predefined conversation map is generated by ordering of at least one conversation block sub-systems with logic for state transition between them, wherein the at least one conversation block sub-system and the logic for state transition between the at least one conversation block sub-system are predefined for each predefined intent and predefined entity stored in the virtual agent system prior to deployment of the virtual agent system using a user interface.

Furthermore, the predefined conversation map includes a sequence of functions to be executed in order to perform a state transition between different conversation block sub-systems for the determination of the text based agent response. In order to generate the predefined conversation map, the conversation management sub-system 225 is configured to select one or more conversation block sub-systems from a plurality of conversation block sub-systems based on a determined intent, an entity associated with the intent, or a combination thereof. In one embodiment, the conversation block subsystem may also include a history map along with the determined intent, the entity associated with the intent, or the combination thereof to select the one or more conversation block sub-systems. In one embodiment, the history map is a structured form data representing conversation block sub-systems from the plurality of conversation block sub-systems 230 selected in previous conversations with the current user and the intents, the entities, and the conversation block sub-systems associated with such previous conversations of the current user. In another embodiment, the history map may also include historical conversational data related to intents, entities and conversation block sub-systems for previous users. Each conversation block sub-system 230 is configured to execute a specific function, for example, but not limited to, a "PNR" conversation block sub-system 230 configured to get PNR for respective flight, a "Book Flight" conversation block sub-system configured to book a flight, a "source and destination" conversation block sub-system configured to get a source and a destination for a travel request, a "add-on" conversation block sub-system configured to provide add-on option to the user and received user response, and the like. Each conversation block sub-system is independently configured to execute its respective specific function, and therefore each conversation block sub-system is designed to be re-usable without need of re-building or reconfiguration for other applications also. For example, the "Book Flight" conversation block sub-system 230 can be re-used for all the available airline companies and is not specific to only one airline company.

Accordingly, based on defined specific functions of each conversation block sub-system 230, the conversation management sub-system 225 selects the one or more conversation block sub-systems 230, sends a request along with the intents and the entities to each selected at least one conversation block for execution of their respective specific functions, and integrates agent intents received from the selected one or more conversation block sub-systems 230. As used herein, the term "agent intent" is a shorthand keyword based representation for generating the text based agent response. For example, "Ask.Entity_Value.Name" is the agent intent, which is further used in the system to generate "Can you please give me your name?". In an additional embodiment, few conversation block sub-systems of the plurality of conversation block sub-systems 230 may function as composite conversation block sub-systems and generates an agent intent based on combining agent intents received from two or more non-composite conversation block sub-systems. For example, but not limited to, the "Book Flight" conversation block sub-system may function as a composite conversation block sub-system and may derive its agent intent by combining agent intents from the "source and destination" conversation block sub-system and "add-on" conversation block sub-system. The composite conversation block sub-system helps in executing a complex function in an easy and convenient manner by reducing integrations at the conversation management sub-system 225 and further keeping the individual conversation block sub-systems separate to maintain re-usability. The one or more conversation block sub-systems 230 are selected based on one of a predefined conversation maps method or a machine learning method.

In an embodiment, each conversation block sub-system 230 may also reject the request received from the conversation management sub-system 225 based on incapability of the conversation block sub-system 230 to recognize the received intents and entities. Each conversation block sub-system 230 recognizes the received intents and entities by referring to a look-up table which comprises previous conversations handled by the respective conversation block sub-system 230 along with the respective intents and entities. In such a case when the conversation block sub-system 230 rejects the request, the conversation management sub-system 225 is further configured to select another conversation block sub-system 230 and re-assign the request to the another conversation block sub-system. In another embodiment, each conversation block sub-system 230 is configured to determine hints related to intents and entities expected to be received from the user in next conversation. The conversation block sub-system shares the hints related to the intents and entities for next conversation with the NLU sub-system 215 for assisting the NLU sub-system 215 in correct extraction of the intents and entities.

Each conversation block sub-system generates and transmits corresponding agent intents to a response generation sub-system 235 operatively coupled to the conversation management sub-system and operable by the one or more processors 220. The response generation sub-system 235 receives the agent intents from each conversation block sub-system 230, and generates a text based agent response for the received intents and entities. The response generation sub-system 235 is configured to consider a language ascent of the user, a mood of the user and previous conversations conducted with the user to generate the appropriate text response for the user for the received utterance from the user. For example, but not limited to, the agent intent generated by the conversation management sub-system 225 is "Get source location", for this agent intent the response generation sub-system 235 generates a text response, "Thanks for the request, could you please provide the source location?".

The text based agent response is transmitted by the conversation management sub-system 225 to a text to speech converter 240 operable by one or more processors 220. The text to speech converter 240 is configured to convert the text response, received from the conversation management sub-system 225, into a voice response and further the text to speech converter 240 sends the voice response to the UE 105.

Figure 3:
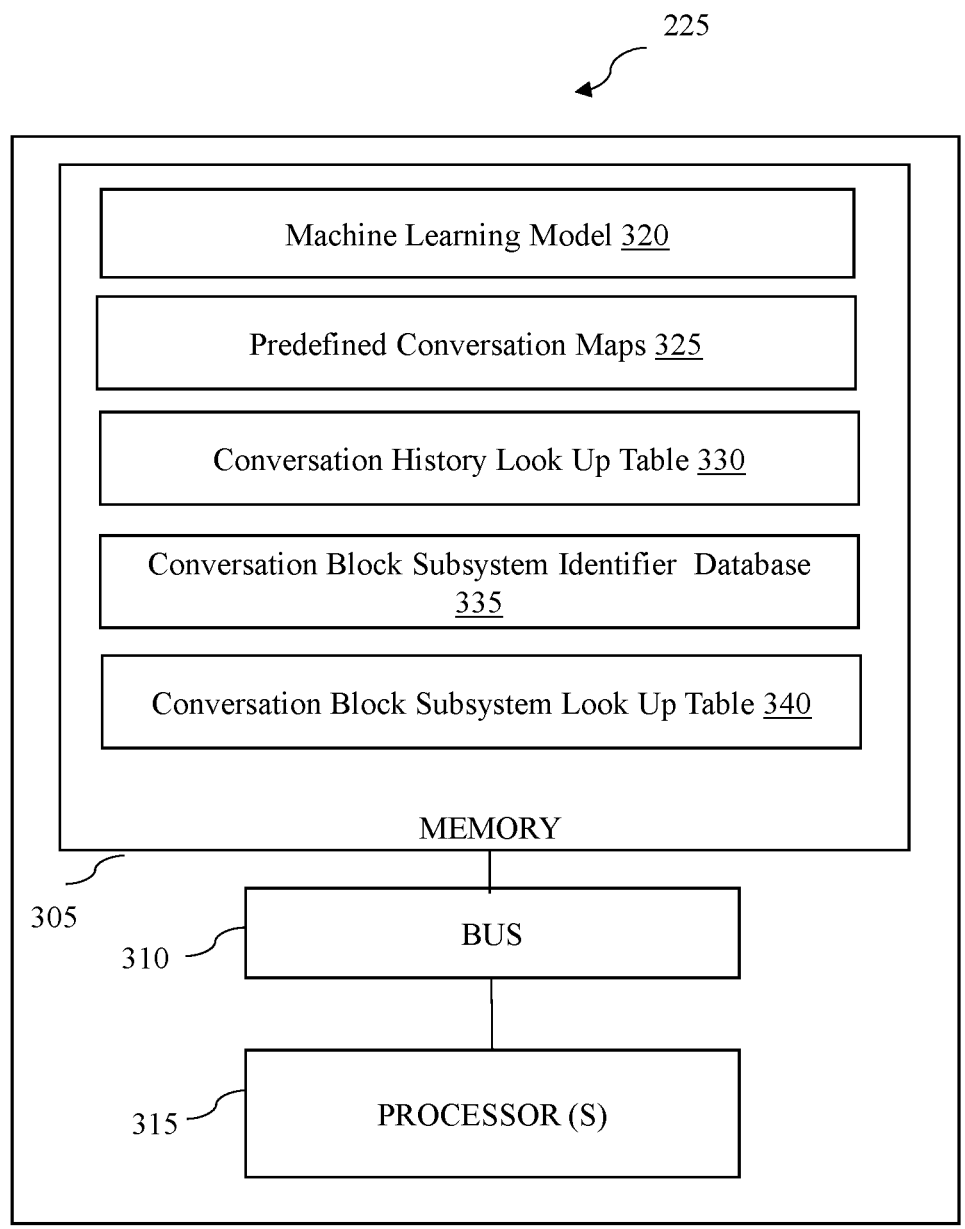
FIG. 3 is a block diagram representation of a conversation management sub-system of the system for conducting the virtual conversation with the user, in accordance with an embodiment of the present disclosure.
Figure 4:
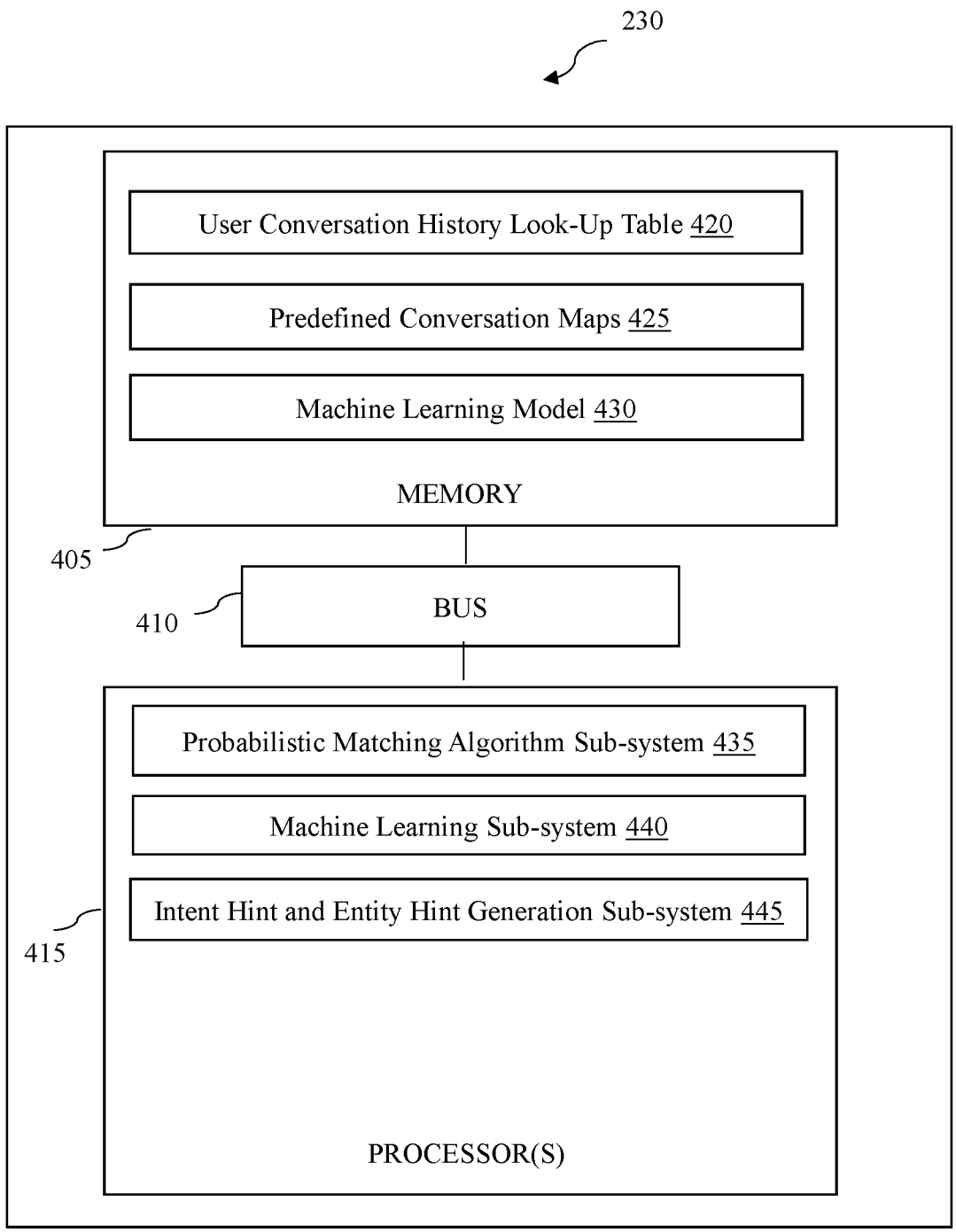
FIG. 4 is a block diagram representation of a conversation block sub-system of the system for conducting the virtual conversation with the user, in accordance with an embodiment of the present disclosure.

The detailed description related to the components of the conversation management sub-system 225 and the conversation block sub-systems 230 are given in the FIG. 3 and FIG. 4, respectively.

FIG. 3 is a block diagram representation of the conversation management sub-system 225 of the virtual agent system 115 for conducting the conversation with the user, in accordance with an embodiment of the present disclosure. The conversation management sub-system 225 includes processor(s) 315, and memory 305 coupled to the processor(s) 315 via a bus 310. In one embodiment, the memory 305 may be located on the conversation management sub-system 225. In another embodiment, the memory 305 may be stored locally on a seeker device.

The processor(s) 315, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 305 includes multiple subsystems stored in the form of executable program which instructs the processor 315 to perform the configuration of the conversation management sub-system 225 illustrated in FIG. 2. The memory 305 has the following subsystems: a machine learning model 320, a plurality of predefined conversation maps 325, a conversation history look-up table 330, a conversation block sub-system identifier database 335, and a conversation block sub-system look-up table 340.

The memory 305 may include any suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. The executable program stored on any of the above-mentioned storage media may be executable by the processor(s) 315.

The processor(s) 315 is configured to receive intents and entities from the SLU sub-system 205 and generate a agent intent for the received intents and entities. The processor(s) 315 upon receiving the intents and the entities associated with the intents, matches the intents and the entities associated with the intents with the predefined intents and the predefined entities stored in the memory 305. The predefined intents and the predefined entities are created and stored in the memory 305 by the developers of the virtual agent system prior to deployment of the virtual agent sub-system. The developers also create and store predefined conversation maps 325 corresponding the predefined intents and the predefined entities prior to deployment of the virtual agent system in the memory 305. Upon receiving the intents and the entities determined by the SLU, the processor 315 compares the intents and the entities with the predefined intents and the predefined entities stored in the memory 305. In situations, where the intents and the entities match with the predefined intents and the predefined entities, the processor 315 executes the conversation management sub-system, which identifies the predefined conversation map 325 associated with the predefined intents and the predefined entities, which are representative of the matched intents and the entities. The conversation management sub-system calls and executes one or more conversation block sub-systems 230 based on the predefined conversation map 325 for generating the agent intent for the intents and the entities received from the SLU.

In one embodiment, a situation may arise in which the received intents and the entities fails to match the predefined intents and predefined entities stored in the memory 305. In such situations, conversation management sub-system is unable to identify the predefined conversation map 325 associated with the received intents and entities which poses a difficulty in generating a agent intent in response to the received intents and entities. In such scenario, the conversation management sub-system is configured to apply a trained machine learning model 320 to select appropriate conversation block sub-systems 230 and further generate the agent intent for the received intents and entities. The machine learning model 320 is trained with sufficient training data set to handle unknown intents and entities encountered during an unstructured conversation with the user. The trained machine learning model 320 is configured to select appropriate conversation block sub-systems 230 based on the received intents and the entities, and generate a predefined conversation map 325 which comprises sequential arrangement of each selected conversation block sub-system 230 along with logic for state transition between the selected conversation block sub-systems 230.

In one embodiment, the processor 315 is configured to store previous conversations along with the respective intents and entities in the memory 305. The processor(s) 315 is further configured to store the previous conversations with respective intents and entities along with identifiers of those conversation block sub-systems 230 which handled the previous conversations. The previous user conversations with respective intents and entities are stored as conversation history maps 330 in the memory 305. The identifiers of the conversation block sub-systems 230 along with their respective previous user conversations are stored in the conversation block sub-system look-up table 340. The list of identifiers of each conversation block sub-system of the plurality of conversation block sub-systems 230 is stored in the conversation block sub-system identifier database 335.

The processor(s) 315 uses the trained machine learning models along with the history map, the previously stored conversations and the previously stored intents and entities generates a new predefined conversation map 325 of one or more conversation block subsystems 230 along with the logic for state transition between them to generate an agent intent for the received intents and entities.

FIG. 4 is a block diagram representation of the conversation block sub-system 230 of the virtual agent system 115 for conducting the conversation with the user, in accordance with an embodiment of the present disclosure. The conversation block sub-system 230 includes processor(s) 415, and memory 405 coupled to the processor(s) 415 via a bus 410. In one embodiment, the memory 405 may be located on the conversation block sub-system 230. In another embodiment, the memory 405 may be stored locally on a seeker device.

The processor(s) 415, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 405 includes multiple subsystems stored in the form of executable program which instructs the processor 415 to perform the configuration of the conversation block sub-system 230 illustrated in FIG. 2. The memory 405 has the following subsystems: a user conversation history look-up table 420, a plurality of predefined conversation maps 425, and a machine learning model 430. The processor(s) 415 has the following subsystems: a probabilistic matching algorithm sub-system 435, a machine learning sub-system 440, and an intent hint and entity hint generation sub-system 445.

The memory 405 may include any suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. The executable program stored on any of the above-mentioned storage media may be executable by the processor(s) 415.

The processor(s) 415 is configured to receive request from the conversation management system 225 along with intents and entities related to user utterances and execute the specific function for which the conversation block sub-system 230 is configured.

In one embodiment, while executing the predefined conversation map during a conversation, a first conversation block sub-system may not be able to generate a corresponding agent intent or transfer control to a second conversation block sub-system as the agent intent generated by the conversation block sub-system does not match the logical state transition. In such scenarios, the conversation block sub-system transfers the respective intents and entities received by the first conversation block sub-system to the machine learning model 430. The machine learning model 430 is trained using sufficient training data set to generate an agent intent for unknown intents and entities encountered in an unstructured user conversation session. The machine learning sub-system 440 is configured to generate the trained machine learning model 430 and evaluate an efficiency of the trained machine learning model 430 before putting it for testing. In an example embodiment, more than one machine learning model 430 may also be present and the machine learning sub-system 440 may be configured to select an appropriate machine learning model to generate the agent intent for the conversation block sub-system. The machine learning model 430 also uses the previously handled user conversations along with the respective intents and entities along with generated agent intents stored in the memory 405 as discussed in FIG. 3. The conversation block sub-system transfers control to the machine learning model and the machine learning model uses the history of user conversations handled by the conversation block sub-systems 230 along with respective intents and entities, and the agent intents to generate the agent intent for the corresponding conversation block. Once the agent intent is generated, the machine learning model either transfers control to the first conversation block sub-system or to the subsequent conversation block sub-system in the predefined conversation map.

Accordingly, for user conversations whose intents and entities are matched to previously stored predefined intents and entities, the processor(s) 415 is configured to execute the specific function and generate the agent intent using the predefined conversation map. Whereas, for user conversations whose intents and entities are unmatched for the conversation block sub-system 230, the processor(s) 415 is configured to execute the specific function and generate the agent intent using the trained machine learning model 430.

In another embodiment, the conversation block sub-system 230 may be a composite conversation block sub-system. In such a scenario, the processor(s) 415 is configured to identify one or more other conversation block sub-systems whose agent intent is required by the processor(s) 415 to execute the specific function. Based on the determination, the processor(s) 415 give a control of the received request to the identified one or more other conversation block sub-systems of the plurality of conversation block sub-systems 230. The identified one or more other conversation block sub-systems are configured to execute their respective sub-functions and send the agent intent to the composite conversation block sub-system. The processor(s) 415 is further configured to receive the agent intent from the one or more other conversation block sub-systems and complete the specific function based on the received agent intent from the one or more other conversation block sub-systems.

In an embodiment, the processor(s) 415 is further configured to determine an intent hint and an entity hint related to an expected user utterance in response to the agent intent generated by the conversation block sub-system 230 for the received intents and entities in the current user conversation. The intent hint and the entity hint are determined based on the previous user conversations handled by the conversation block sub-system 230, the received intents and the entities, and the agent intent generated by the conversation block sub-system 230. For example, but not limited to, the agent intent generated by the conversation block sub-system 230 is "source location?", then the intent hint generated for this agent intent is "receive" and entity hint generated for this agent intent is "name of a place".

In an embodiment, the processor(s) 415 is further configured to send the generated intent hint and entity hint to the NLU sub-system 215.

Figure 5A:
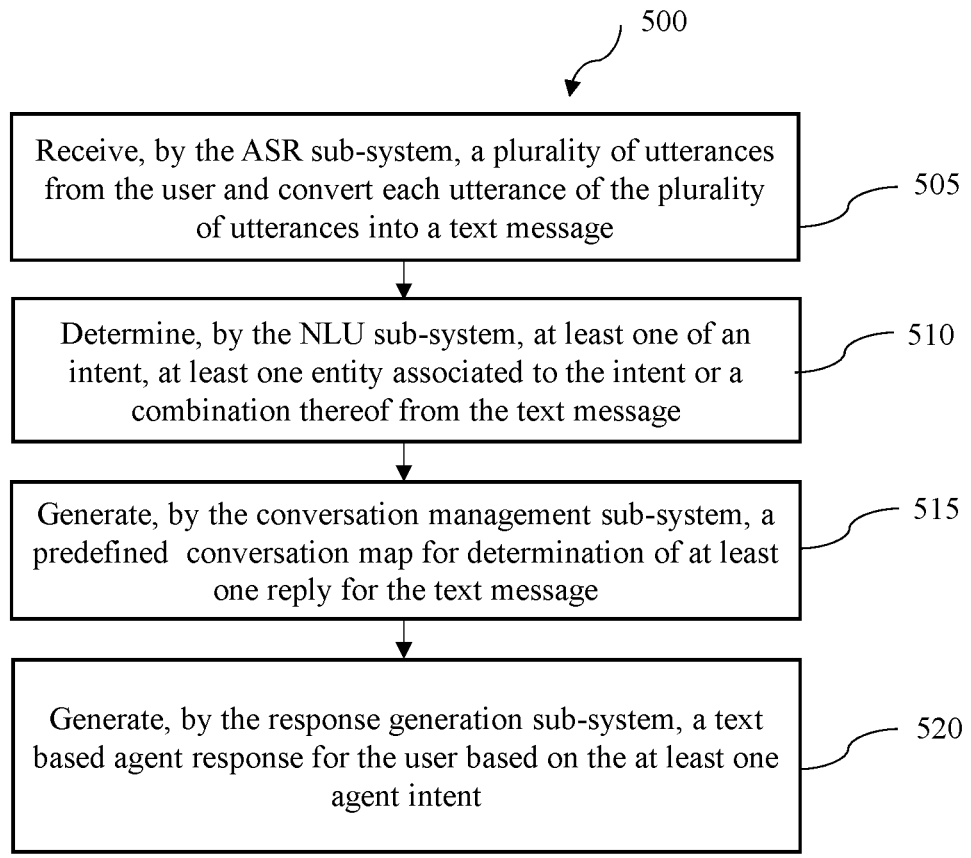
FIGS. 5A-5C collectively is a flow diagram representing steps involved in a method for conducting the virtual conversation with the user, in accordance with an embodiment of the present disclosure.
Figure 5B:
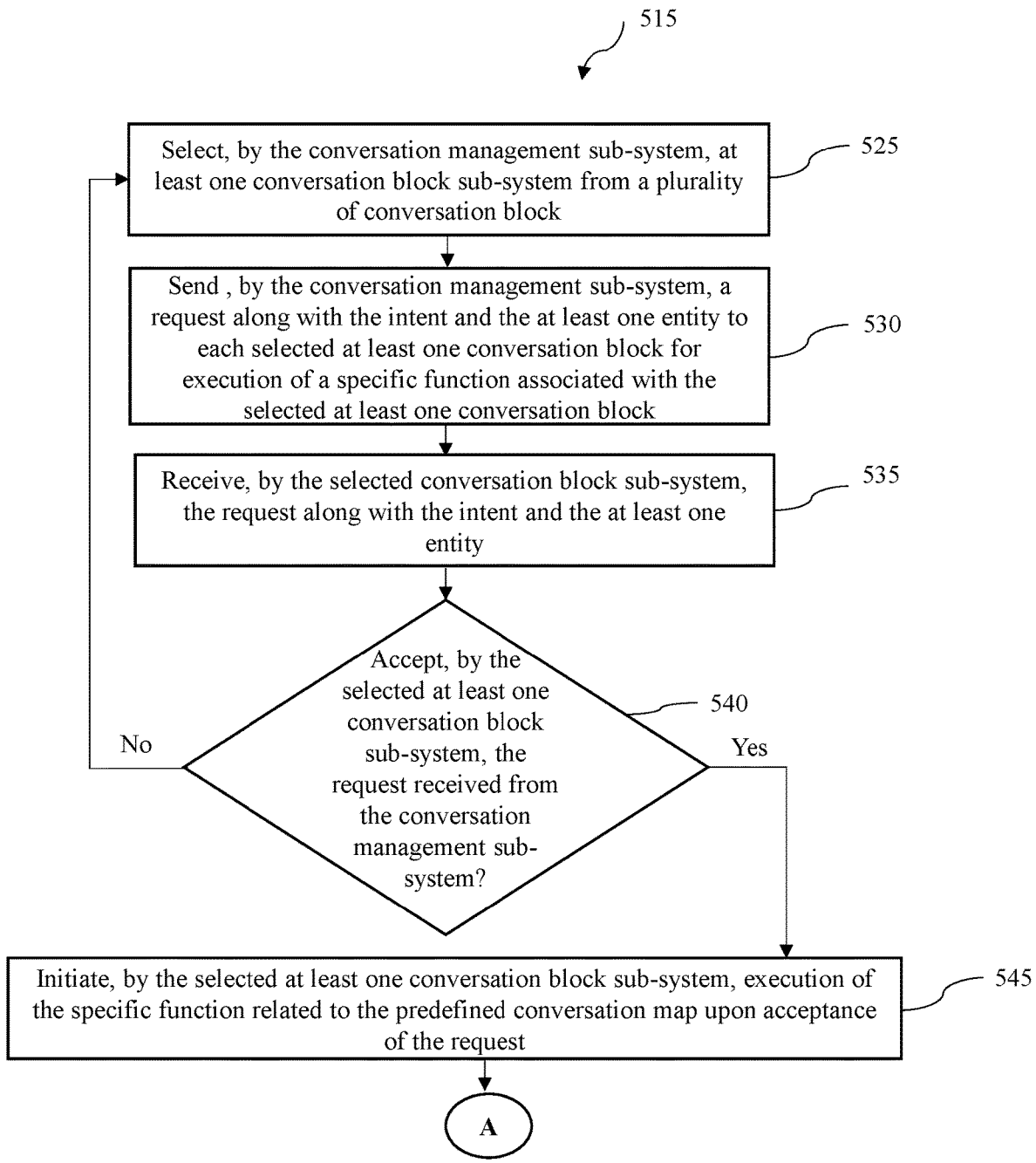
Figure 5C:
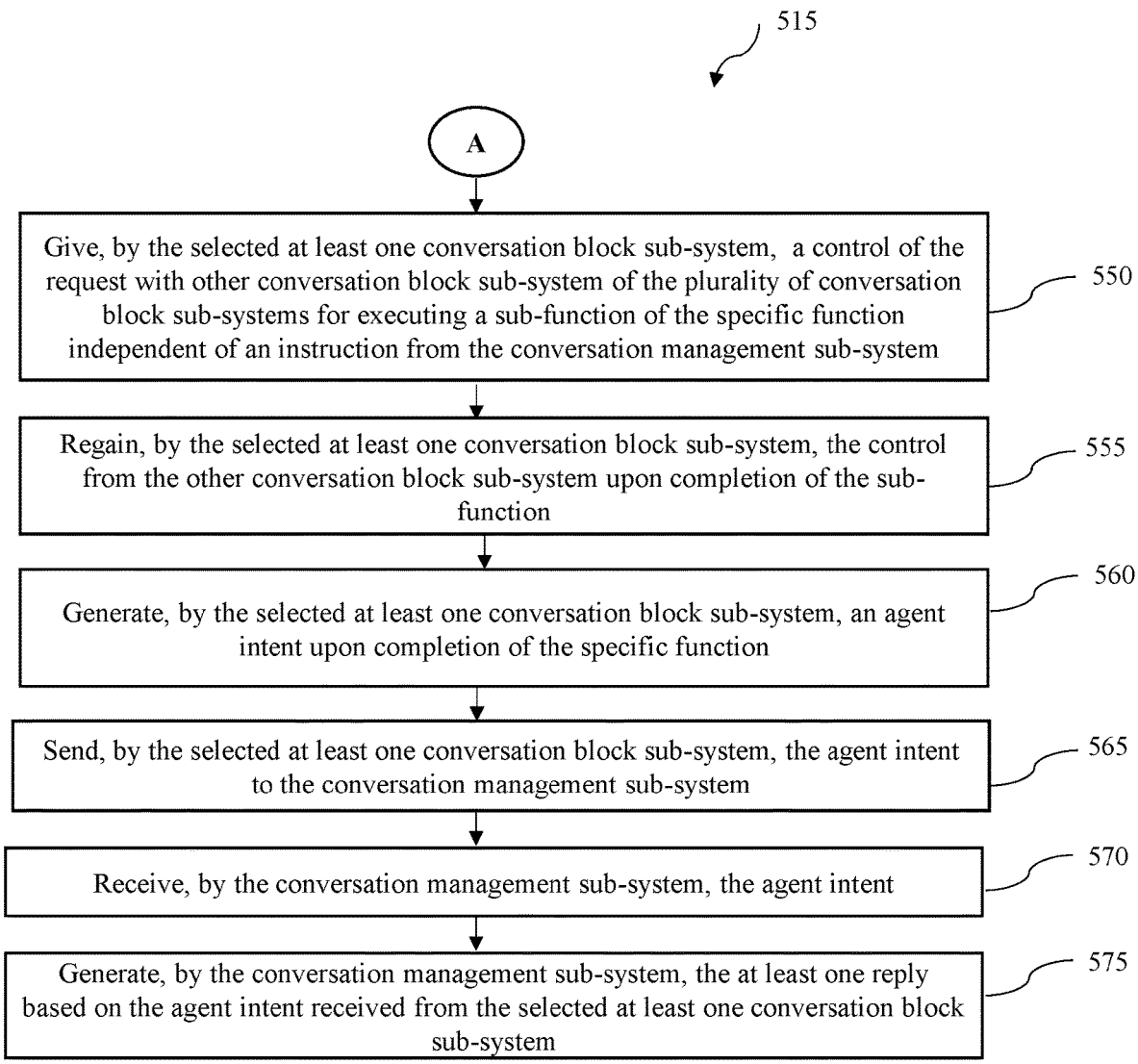

FIGS. 5A, 5B and 5C collectively illustrates a flow diagram representing steps involved in a method 500 for conducting the virtual conversation with the user, in accordance with an embodiment of the present disclosure. The method 500 includes steps 505-520. The FIGS. 5B and 5C collectively illustrates sub-steps involved in the step 515 of the method 500. At step 505, the method 500 includes receiving, by the ASR sub-system 210, a plurality of utterances from the user, and further converting, by the ASR sub-system, each utterance of the plurality of utterances into a text message. At step 510, the method 500 further includes determining, by the NLU sub-system 215, an intent, at least one entity associated to the intent, or a combination thereof from the text message. At step 515, the method 500 includes generating, by the conversation management sub-system 225, a predefined conversation map based on predefined intents, predefined entities, or a combination thereof stored in the virtual agent system and the intent, entities, or a combination thereof determined from the text message for a determination of at least one text based agent response for the text message. At step 520, the method 500 further includes generating, by a response generation sub-system 235, a text based agent response for the user based on the at least one agent intent.

In an embodiment, the step 515 of the method 500 includes various sub-steps for generation of the predefined conversation map for determining the text based agent response for the received intent and the at least one entity. The sub-steps of the step 515 include steps 525-575 which are collectively illustrates by the FIGS. 5B and 5C.

At sub-step 525, the method 500 includes selecting, by the conversation management sub-system, at least one conversation block sub-system 230 from a plurality of conversation block sub-systems. The at least one conversation block sub-system 230 is selected based on the determined intent, the at least one entity and a history map of a list of conversation block sub-systems of the plurality of conversation block sub-systems 230 selected in previous conversations with the user. At sub-step 530, the method 500 includes sending, by the conversation management sub-system 225, a request along with the intent and the at least one entity to each selected at least one conversation block 230 for execution of a specific function associated with the selected at least one conversation block. At sub-step 535, the method 500 includes receiving, by the selected at least one conversation block 230, the request from the conversation management sub-system 225. At sub-step 540, the method 500 includes determining whether the request is accepted or denied by the selected at least one conversation block sub-system 230. The selected at least one conversation block sub-system 230 may accept or reject the request based on a capability of the selected at least one conversation block sub-system to execute the specific function related to the predefined conversation map. If the selected at least one conversation block sub-system 230 is not capable of executing the specific function based on the received intent and at least one entity, the selected at least one conversation block sub-system 230 denies the request, otherwise the selected at least one conversation block sub-system 230 accepts the request.

If the selected at least one conversation block sub-system 230 accepts the request, the method 500 proceeds towards sub-step 545 otherwise the method 500 switches back to the sub-step 525. At sub-step 545, the method 500 includes initiating, by the selected at least one conversation block sub-system 230, execution of the specific function related to the predefined conversation map upon acceptance of the request. At sub-step 550, the method 500 includes giving, by the selected at least one conversation block sub-system 230, a control of the request with other conversation block sub-system of the plurality of conversation block sub-systems 230 for executing a sub-function of the specific function independent of an instruction from the conversation management sub-system 225. At sub-step 555, the method 500 includes regaining, by the selected at least one conversation block sub-system 230, the control from the other conversation block sub-system upon completion of the sub-function. At sub-step 560, the method 500 includes generating, by the selected at least one conversation block sub-system 230, the agent intent upon completion of the specific function. At sub-step 565, the method 500 includes sending, by the selected at least one conversation block sub-system 230, the agent intent to a response generation sub-system. At sub-step 570, the method 500 includes receiving, by the response generation sub-system, the agent intent. At sub-step 575, the method 500 includes generating, by the response generation sub-system, the at least one text based agent response based on the agent intent received from the selected at least one conversation block sub-system 530.

Various embodiments of the present disclosure provide a technical solution to the problem for conducting intelligent virtual conversations with user using virtual agent system. The present system eliminates the need of re-building of virtual agent system for every specific application. The present system provides an efficient virtual agent system for conducting intelligent conversation with the user by using separately configured conversation block sub-systems which works independently and includes machine learning capability for addressing unstructured conversations in efficient manner. The conversation block sub-systems of the virtual agent system are individual blocks which can be re-used in different predefined conversation maps for different applications without need of re-building or re-configuration. Therefore, the present virtual agent system provides a drag and drop like function for creating a predefined conversation map in which conversation block sub-systems can be selected according to required predefined conversation map like a drag and drop facility. This feature enhances re-usability of the conversation block sub-systems and helps clients with no technical background to create their own predefined conversation maps according to their requirements.

Moreover, the present virtual agent system provides reusability of the NLU sub-system along with the conversation block sub-systems, this enhances the compatibility of the virtual agent system with different application systems.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A method for conducting a conversation between a user and a virtual agent, the method comprising:
   determining an intent from a text message, the text message being derived from a plurality of utterances of a user;
   generating, by a conversation management sub-system, a predefined conversation map based on predefined intents and the intent determined from the text message; and
   generating, using multiple agent intents from multiple conversation block sub-systems, at least one text based agent response for the text message based on:
      selecting, by the conversation management sub-system, at least one conversation block sub-system from a plurality of conversation block sub-systems accessible to the conversation management sub-system;
      sending, by the conversation management sub-system, a request along with the intent to each selected at least one conversation block sub-system for execution of a specific function associated with the selected at least one conversation block;
      at least one of accepting or denying, by the selected at least one conversation block sub-system, the request received from the conversation management sub-system based on a capability of the selected at least one conversation block sub-system to execute the specific function;
      initiating, by the selected at least one conversation block sub-system, execution of the specific function related to the predefined conversation map upon acceptance of the request;
      giving, by the selected at least one conversation block sub-system, a control of the request to at least one other conversation block sub-system of the plurality of conversation block sub-systems for executing a sub-function of the specific function, the at least one other conversation block sub-system executing the sub-function independent of an instruction from the conversation management sub-system;
      regaining, by the selected at least one conversation block sub-system, the control from the at least one other conversation block sub-system upon completion of the sub-function; and
      generating, by the selected at least one conversation block sub-system, an agent intent upon completion of the specific function,
      wherein a first conversation block sub-system performs, without use of a first machine learning model, the execution of the specific function related to the predefined conversation map in response to the first conversation block generating, using a first probabilistic algorithm, a given agent intent that matches a logical state transition of the predefined conversation map, and wherein the first conversation block subsystem uses a first machine learning model to generate at least one of the agent intents in response to the first conversation block generating, using the first probabilistic algorithm, a given agent intent that does not match a logical state transition of the predefined conversation map.

2. The method of claim 1, wherein a first conversation block sub-system performs, without use of a first machine learning model, the execution of the specific function related to the predefined conversation map in response to the first conversation block generating a first agent intent that matches a logical state transition of the predefined conversation map.

3. The method of claim 1, wherein a first conversation block sub-system uses a first machine learning model to generate the agent intent in response to the first conversation block generating a first agent intent that does not match a logical state transition of the predefined conversation map.

4. The method of claim 1, wherein giving the control of the request comprises giving the control of the request to a machine learning model for the execution of one of the sub-function of the specific function.

5. The method of claim 1, wherein selecting the at least one conversation block sub-system comprises selecting, using a machine learning model, the at least one conversation block sub-system from the plurality of conversation block sub-systems based on the intent and a history of past conversations handled by the selected at least one conversation block sub-system.

6. The method of claim 5, wherein generating the predefined conversation map comprises generating, using the machine learning model, the predefined conversation map based on the predefined intents and the intent.

7. The method of claim 1, wherein generating the at least one text based agent response for the text message comprises combining two or more agent intents to generate the at least one text based agent response.

8. A method for conducting a conversation with a user using a virtual agent system comprising:
receiving a plurality of utterances from the user and convert each utterance of the plurality of utterances into a text message;
determining an intent from the text message; and
generating, via multiple conversation block sub-system, agent intents based on the intent by sending the intent to each of the multiple conversation block sub-system and obtaining the agent intents from the multiple conversation block sub-system,
wherein generating the agent intents comprises a first conversation block sub-system of the multiple conversation block sub-system performing operations comprising:
generating, without use of a first machine learning model, a first agent intent using a first probabilistic algorithm;
providing the first agent intent as one of the agent intents in response to an identification of at least one match between the first agent intent and a predefined intent; and
generating a second agent intent using the first machine learning model, and providing the second agent intent as one of the agent intents, in response to a failure to identify the at least one match.

9. The method of claim 8, further comprising:
generating a response for the user based on the agent intents, wherein the response comprises a message derived from two or more agent intents.

10. The method of claim 8, further comprising:
selecting, using a machine learning model, the multiple conversation block sub-systems from a set of conversation block sub-systems to generate the agent intents.

11. The method of claim 8, further comprising:
generating, using a machine learning model, a predefined conversation map based on predefined intents and the intent; and
selecting, using the predefined conversation map, the multiple conversation block sub-systems from a set of conversation block sub-systems to generate the agent intents.

12. A system comprising: one or more processors programmed with instructions that, when executed by the one or more processors, cause operations comprising:
receiving utterances from a user and determining an intent based on the utterances;
selecting multiple conversation block sub-systems from a set of conversation block sub-systems;
sending a request comprising the intent to each selected conversation block sub-system of the multiple conversation block sub-systems for execution of a specific function associated with the selected conversation block sub-system;
in response to sending the request, obtaining agent intents from the multiple conversation block sub-systems; and
generating a response based on the agent intents,
wherein a first conversation block sub-system of the multiple conversation block sub-systems generates an agent intent of the agent intents by:
giving a control of the request to at least one other conversation block sub-system of the set of conversation block sub-systems to execute a sub-function of the specific function associated with the first conversation block sub-system, the at least one other conversation block sub-system executing the sub-function; and
regaining the control of the request from the at least one other conversation block sub-system to provide the agent intent,
wherein the first conversation block sub-system performs, without use of a first machine learning model, the execution of the specific function associated with the first conversation block sub-system in response to the first conversation block generating, using a first probabilistic algorithm, a given agent intent that matches a logical state transition of a predefined conversation map, and
wherein the first conversation block sub-system uses the first machine learning model to generate the agent intent in response to the first conversation block sub-system generating, using the first probabilistic algorithm, a given agent intent that does not match a logical state transition of the predefined conversation map.

13. The system of claim 12, wherein the first conversation block sub-system performs, without use of a first machine learning model, the execution of the specific function associated with the first conversation block sub-system in response to the first conversation block generating a first agent intent that matches a logical state transition of a predefined conversation map.

14. The system of claim 12, wherein the first conversation block sub-system uses a first machine learning model to generate the agent intent in response to the first conversation block sub-system generating a first agent intent that does not match a logical state transition of a predefined conversation map.

15. The system of claim 12, wherein giving the control of the request comprises giving the control of the request to a machine learning model for the execution of the sub-function of the specific function.

16. The system of claim 12, wherein selecting the multiple conversation block sub-systems comprises selecting, using a machine learning model, the first conversation block sub-system from the set of conversation block sub-systems based on the intent and a history of past conversations handled by the first conversation block sub-system.

17. The system of claim 12, the operations further comprising:
- generating, using a machine learning model, the predefined conversation map based on predefined intents and the intent; and
- selecting, using the predefined conversation map, the multiple conversation block sub-systems from the set of conversation block sub-systems to generate the agent intents.

18. The system of claim 12, wherein generating the response comprises determining text for the response based on the agent intents.

19. The system of claim 12, wherein generating the response comprises combining two or more agent intents to generate the response.

* * * * *